M. MITCHELL.
HANDCUFF.
APPLICATION FILED NOV. 16, 1908.
936,797.
Patented Oct. 12, 1909.
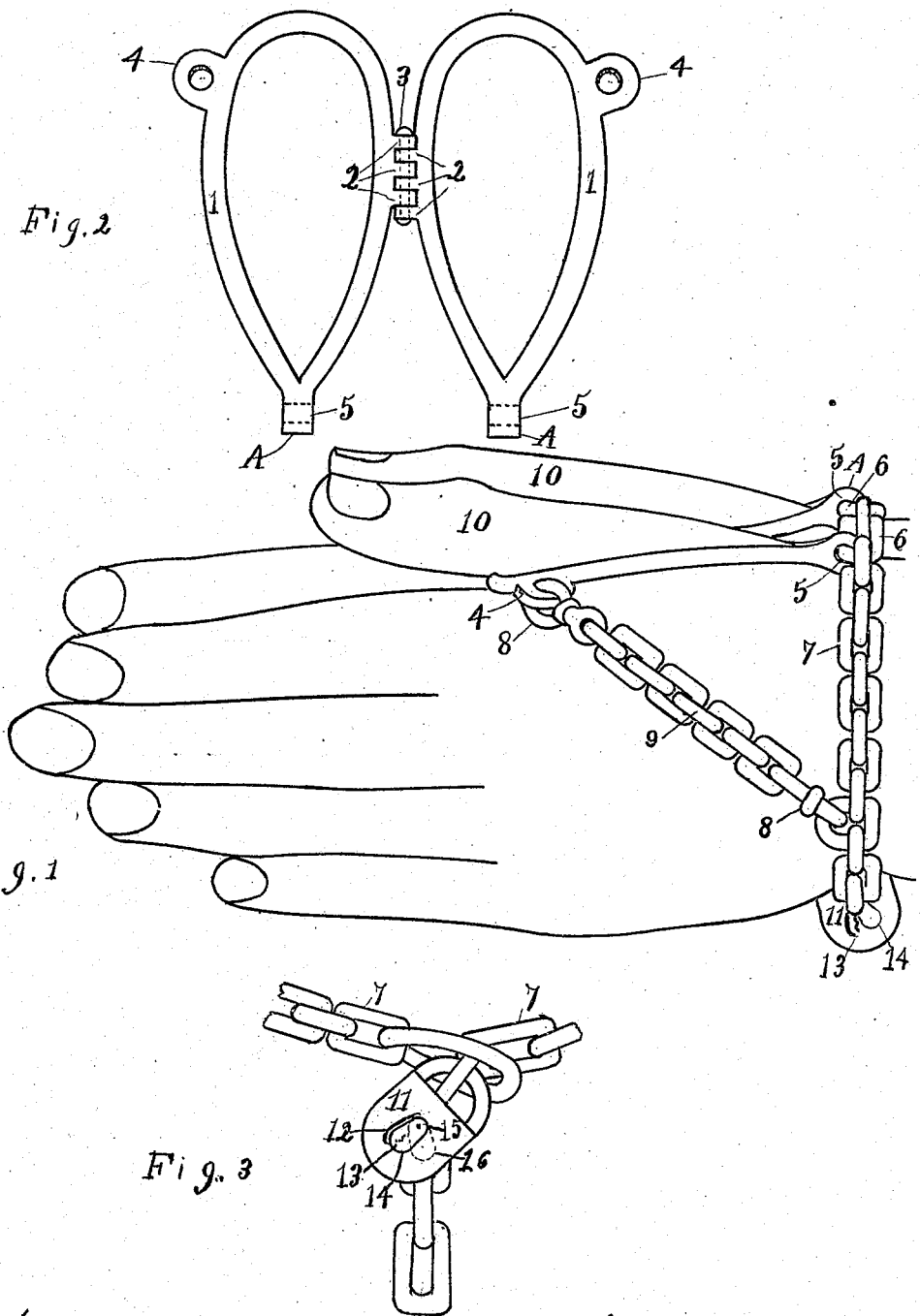

UNITED STATES PATENT OFFICE.

MEEK MITCHELL, OF WICHITA, KANSAS.

HANDCUFF.

936,797. Specification of Letters Patent. Patented Oct. 12, 1909.

Application filed November 16, 1908. Serial No. 462,825.

*To all whom it may concern:*

Be it known that I, MEEK MITCHELL, a resident of Wichita, in the county of Sedgwick and State of Kansas, have invented certain new and useful Improvements in Handcuffs; and I do hereby declare the following to be a full, clear, and exact description of the invention, such as will enable others skilled in the art to which it appertains to make and use the same.

My invention relates to hand-cuffs and has for its object the production of a cheap and flexible cuff, one that is light and can be carried in the pocket without being a burden or inconvenience to an officer.

My invention comprehends the construction and arrangement of parts to be hereinafter described, illustrated in the accompanying drawing and succinctly defined in the appended claims.

Figure 1 is a view of my cuff as applied to both hands. Fig. 2, a view of a pair of rings through which the thumbs pass. Fig. 3, shows the manner in which the chain is connected and locked.

A pair of rings 1, are of the form shown in Fig. 2, and are provided with lateral extensions 2, which are hinged together with a rivet 3, on the opposite side of said rings are perforated lugs 4, on the opposite portion of said rings are extensions A, which have holes 5, to receive links 6, of a chain 7, a chain 9, having swivel links 8, on each end connecting the wrist chain 7, to the lugs 4. When the cuffs are to be used the thumbs 10, are placed in the rings 1, and the chain 7, is put around the wrists as shown, one end of the chain 7, is put through the other end and pulled through until it is as tight as desired and a lock 11, is put in a link which secures the ends of the chain together. The said lock has a lateral extending rib 12, to make a shield for the cover 14, of the key-hole 13 which cover is connected to the lock by means of a pivot 15, and is to be swung to one side as indicated by the dotted lines 16. The object of this rib is to prevent the prisoner from rubbing the lock against some object and turning the cover 14, off the keyhole and by some means entering the key.

Having described my invention, what I claim is:—

1. In a hand-cuff, a wrist chain having attached thereto a pair of rings to receive the thumbs, said rings hinged together and provided with perforated lugs, and chains having swivel links on their ends to connect the lugs to the aforesaid chain and means for connecting said rings to the wrist chain, substantially as shown and described.

2. In a hand-cuff, a wrist chain having attached thereto a pair of rings to receive the thumbs, said rings hinged together and provided with perforated lugs, and chains having swivel links on their ends to connect the lugs to the aforesaid chain and means for connecting said rings to the wrist chain, and means for tightening and locking the free ends of the aforesaid chain, as shown and described.

3. A pair of rings having perforated lugs, a wrist chain said rings hinged together, and attached to said wrist-chain swiveled chains connecting said rings and wrist-chain as described.

In testimony whereof, I have signed this specification in the presence of two subscribing witnesses.

MEEK MITCHELL.

Witnesses:
W. F. McCABE,
W. S. BROWN.